J. HOPKINSON.
COMPUTING SCALE.
APPLICATION FILED OCT. 18, 1913.
1,125,846.
Patented Jan. 19, 1915.
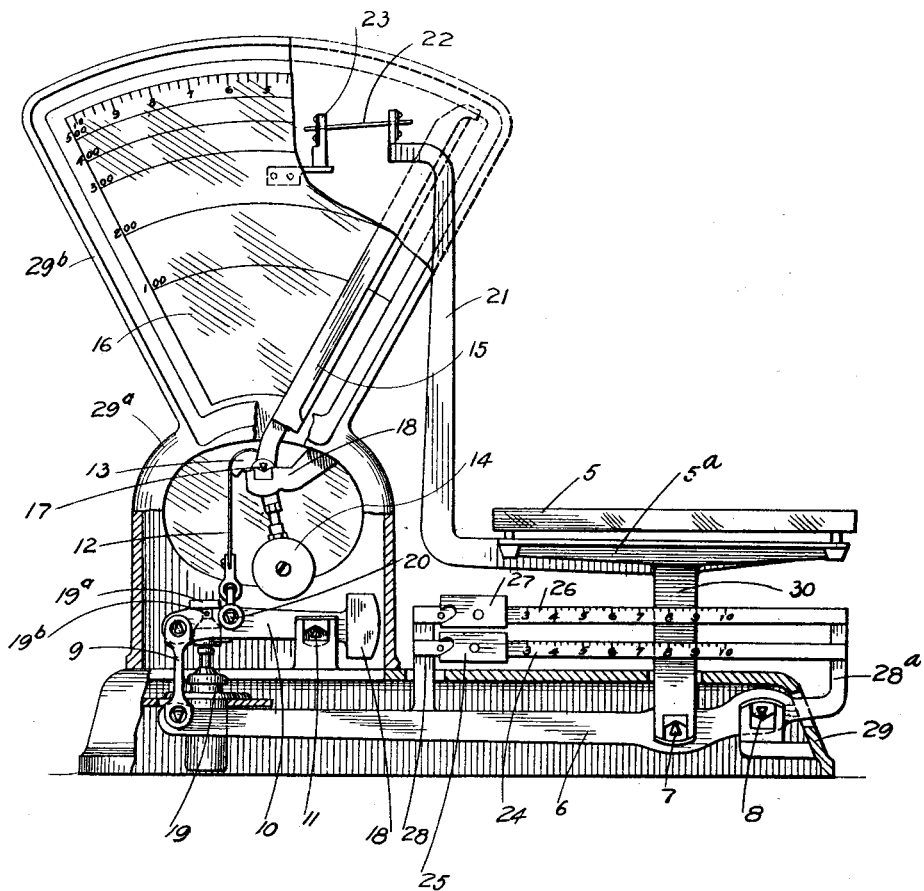
Witnesses:
Inventor:
Joseph Hopkinson

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,125,846.  Specification of Letters Patent.  Patented Jan. 19, 1915.

Application filed October 18, 1913.  Serial No. 796,018.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to computing scales, and has for its object the improvement of the mechanism by which the commodity supporting element or platform effects the movement of the weight and value indicating elements. By means of these improvements I have produced a scale that is accurate, efficient, and very compact in form.

My invention includes improvements in the lever mechanism and associated parts, and other features, which will become apparent in the following specification when taken in connection with the accompanying drawing.

The drawing represents a vertical section of the machine partly in elevation.

My improved scale comprises the usual platform 5, which is disposed above the base 29 and provided with a downwardly projecting support 30 terminating in knife-edge bearings 7, where it imparts its pressure to the lever 6. This lever is mounted within the base upon knife-edge bearings 8, which are suitably secured to said base.

The extremity of the long arm of the lever 6 is joined to an intermediate lever 10 by a link or links 9, which are suitably attached to said lever by knife-edge bearings. This intermediate lever is provided with a fulcrum 11, at which point knife-edge bearings are provided. The pressure upon the fulcrum is upward. The intermediate lever 10 is pivotally connected by knife-edge bearings 20 with a flexible element or tape 12, preferably of metal, which rolls about a hub portion 13, of a pendulum 14. The hub portion has a curved form where it receives the tape, said curved form having a variable radius with relation to the pivot 17. Said curve coöperates with the variable effective weight arm of the pendulum to bring about the desired movements of the indicating arm 15.

The indicating arm sweeps across a computing chart 16, which is inclosed in an upwardly projecting portion 29$^b$ of the frame. The indicating arm 15, the pendulum 14, and the hub 13 are rigidly secured together and are supported by knife-edge bearings 17, which are in turn supported by an arm or arms 18 projecting inwardly from the inclosing frame or base 29$^a$.

The variable radius of the curved face of the hub 13 is so proportioned as to coöperate with the variable effective weight arm of the pendulum in causing equilibrium, and of causing equal additions of load on the platform 5 to produce equal angular movements of the arm 13 across the chart 16. The lever 10 is provided with a weighted portion 18 upon the side of its fulcrum opposite the point of attachment of the tape. The said weighted portion is effective in counterbalancing both the levers 10 and 6, and other parts, as well as in relieving a great part of the pressure on the knife-edge bearing 11. I provide a dash-pot 19, suitably mounted on the base 29 and pivotally connected with the intermediate lever 10 by means of the pin 19$^b$, said pin is carried by a plate 19$^a$ secured to the lever 10. The upwardly extending arm 21, rigidly secured to the platform element 5$^a$, is pivotally attached to the link 22, which, in turn, is pivotally attached to a base 23 fixed to the upwardly projecting portion 29$^b$ of the casing. By means of this link connection, which I prefer to term a high check, the platform is very efficiently held in equilibrium. The link 22 is proportioned and mounted with suitable reference to that portion of the lever 6 lying between the knife-edge bearings 7 and 8, whereby parallel and harmonious movements are insured. The usual auxiliary scale beams 24 and 26, provided with the movable weights 25 and 27, are rigidly attached to the main lever 6 by the arms 28 and 28$^a$.

In the operation of my improved scale it will be seen that when a commodity is placed upon the platform the downward pressure thereof will cause a downward movement of the lever 6. This downward movement is transmitted by the link or links 9 to the intermediate or secondary lever 10. The downward pressure is by this lever imparted to the tape 12, and the resistance of said tape causes the upward pressure upon the fulcrum 11. The downward pull of the tape imparts a movement to the pendulum. The movement of the pendulum away from its normal position, as shown in the drawings, causes its effective weight arm to increase. Said effective weight arm is the horizontal distance from its center of gravity to a vertical line through the pivot 17. Said movement of the pendulum causes the hub to assume new positions, in which the tape 12 acts at a decreasing radii. Different loads upon the platform will cause the pendulum and associated parts to come to positions of equilibrium, in which the indicating arm 15 takes positions making angles of greater or less degree in direct proportion to the loads upon the platform. The high check 22 insures equilibrium of the platform and smooth working of the parts. The dash-pot prevents undue vibration.

While I have described my invention more or less precisely as regards details of construction, I do not wish to be limited thereto unduly for the reason that I contemplate changes in the form and the substitution of equivalent parts as circumstances suggest or render expedient without departing from the spirit of my invention.

I claim,—

1. In a device of the class described, a main lever, an intermediate lever, a link connecting said main and intermediate levers, a commodity-supporting element mounted on said main lever between its fulcrum and point of connection to the intermediate lever, a pendulum, a flexible supporting member attached to the hub of said pendulum and adapted to roll upon said hub, said flexible member being also attached to said intermediate lever, said intermediate lever being weighted upon the side of its fulcrum opposite the point of attachment of said flexible supporting member, and weight and value-indicating means actuated by the movements of said pendulum.

2. In a device of the class described, a main lever, an intermediate lever, a link connecting said main and intermediate levers, a commodity-supporting element mounted on said main lever between its fulcrum and point of connection to the intermediate lever, a pendulum, a flexible supporting member attached to the hub of said pendulum and adapted to roll upon said hub, said flexible member being also attached to said intermediate lever, said intermediate lever being weighted upon the side of its fulcrum opposite the point of attachment of said flexible supporting member, weight and value-indicating means actuated by the movements of said pendulum, and a dash-pot operatively connected with said intermediate lever.

3. In a device of the class described, a main lever, a secondary lever above said main lever, a link connecting said main and secondary levers at an end of each lever, a commodity-supporting element mounted on said main lever at an intermediate point thereof, a pendulum, a flexible supporting member attached to the hub of said pendulum and adapted to roll upon said hub, said flexible member being also attached to an intermediate point of said secondary lever, and weight and value-indicating means actuated by the movement of said pendulum.

4. In a device of the class described, a main lever, an intermediate lever above said main lever, said intermediate lever being adapted to exert an upward pressure on its fulcrum, a link connecting said main and intermediate levers, a commodity-supporting element mounted on said main lever between its fulcrum and point of connection to the intermediate lever, a pendulum, a flexible supporting member attached to the hub of said pendulum and adapted to roll upon said hub, said flexible member being also attached to said intermediate lever, and weight and value-indicating means actuated by the movement of said pendulum.

5. In a device of the class described, a main lever, an intermediate lever above said main lever, said intermediate lever being adapted to exert an upward pressure on its fulcrum, a link connecting said main and intermediate levers, a commodity-supporting element mounted on said main lever between its fulcrum and point of connection to the intermediate lever, a pendulum, a flexible supporting member attached to the hub of said pendulum and adapted to roll upon said hub, said flexible member being also attached to said intermediate lever, and weight and value-indicating means actuated by the movement of said pendulum, said intermediate lever being weighted upon the side of its fulcrum opposite the point of attachment of said flexible supporting member.

6. In a device of the character described a main lever, an intermediate lever above said main lever, a link connecting said main and intermediate levers, a commodity supporting element mounted on said main lever between its fulcrum and point of connection to the intermediate lever, a pendulum, a flexible supporting member attached to the hub of said pendulum and adapted to roll upon said hub, said flexible member being also attached to said intermediate lever, said intermediate lever being adapted to exert an upward pressure on its fulcrum, and being weighted upon the side of its fulcrum opposite the point of attachment of said flexible supporting member, weight and value-indicating means actuated by the movement of said pendulum, and a dash-pot operatively connected with said intermediate lever.

7. In a device of the class described, a main lever, an intermediate lever, a link connecting said main and intermediate levers, a commodity-supporting element mounted on said main lever between its fulcrum and point of attachment to the intermediate lever, said intermediate lever being located over one end of said main lever and said commodity-supporting element being located over the other end thereof, a pendulum, weight and value-indicating means actuated by the movement of said pendulum, an upwardly extending arm of said commodity-supporting element, a frame having an upwardly extending portion, and means for movably attaching said arm to said frame portion.

8. In a device of the class described, a main lever, an intermediate lever, a link connecting said main and intermediate levers, a commodity-supporting element mounted on said main lever between its fulcrum and point of attachment to the intermediate lever, said intermediate lever being located over one end of said main lever and said commodity-supporting element being located over the other end thereof, a pendulum, weight and value-indicating means actuated by the movement of said pendulum, an upwardly extending arm on said commodity-supporting element, a frame having an upwardly extending portion, and means for movably attaching said arm to said frame portion, said upwardly extending frame portion being adapted to inclose said weight and value-indicating means.

9. In a device of the class described, a main lever with its fulcrum at one end thereof, a commodity-supporting element above the corresponding end portion of said lever and mounted at an intermediate point thereon, a secondary lever above the other end portion of the main lever, a link connecting the corresponding ends of the two levers, a pendulum connected operatively to said secondary lever, a counterweight on said secondary lever at the end thereof toward the commodity-supporting element, and weight and value-indicating means actuated by the movement of said pendulum.

10. In a device of the class described, a main lever, a commodity supporting platform above one end portion thereof, a secondary lever above the opposite end portion thereof, a link connecting the respective ends of said levers, said secondary lever extending from said link toward said platform, a fulcrum for the main lever at its end opposite said link, a pivotal support for said platform on said main lever at an intermediate point thereof, a pendulum connected operatively to said secondary lever, and weight and value indicating means actuated by the movement of said pendulum.

In testimony whereof, I have subcribed my name.

JOSEPH HOPKINSON.

Witnesses:
A. S. HENDRICK,
H. A. LEONARD.

Copies of this patent may be obtained for five cents each, by addressing the "Commissioner of Patents, Washington, D. C."